United States Patent
Huang et al.

(10) Patent No.: US 11,710,277 B2
(45) Date of Patent: Jul. 25, 2023

(54) MAP DATABASE CREATION METHOD, MOBILE MACHINE USING THE SAME, AND COMPUTER READABLE STORAGE MEDIUM

(71) Applicant: UBTECH ROBOTICS CORP LTD, Shenzhen (CN)

(72) Inventors: Mingqiang Huang, Shenzhen (CN); Zhichao Liu, Shenzhen (CN); Youfang Lai, Shenzhen (CN); Yun Zhao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 154 days.

(21) Appl. No.: 17/482,450

(22) Filed: Sep. 23, 2021

(65) Prior Publication Data

US 2022/0180609 A1    Jun. 9, 2022

Related U.S. Application Data

(63) Continuation of application No. PCT/CN2020/133916, filed on Dec. 4, 2020.

(51) Int. Cl.
*G06T 19/00* (2011.01)
*G06T 19/20* (2011.01)
(Continued)

(52) U.S. Cl.
CPC ............ *G06T 19/003* (2013.01); *G06F 16/29* (2019.01); *G06T 7/73* (2017.01); *G06T 15/50* (2013.01);
(Continued)

(58) Field of Classification Search
None
See application file for complete search history.

(56) References Cited

U.S. PATENT DOCUMENTS

2016/0179830 A1\*  6/2016  Schmalstieg .......... G06T 19/20
                                                    707/722
2018/0072313 A1\*  3/2018  Stenneth ................ G01S 17/89
(Continued)

FOREIGN PATENT DOCUMENTS

CN          111652934 A      9/2020

OTHER PUBLICATIONS

Churchill et al. "Experience-based navigation for long-term localisation." The International Journal of Robotics Research 32.14: 1645-1661. (Year: 2013).\*
(Continued)

*Primary Examiner* — Kee M Tung
*Assistant Examiner* — Jed-Justin Imperial (57) ABSTRACT

A map database creation method is provided. The method includes: obtaining a factor set including factors; dividing a map database into levels based on the factors, and taking each interval of the last level as one sub-database; creating an initial map based on a factor value of each factor corresponding to each sub-database, and creating the sub-database as an initial map database by storing the corresponding initial map in the sub-database; finding the initial map matching a current lighting condition from the initial map database based on the current lighting condition, and taking the found initial map as a positioning map; and performing a visual positioning based on the positioning map, creating an expanded map corresponding to the current lighting condition based on the visual positioning, and creating the sub-database corresponding to the current lighting condition as an expanded map database by storing the corresponding expanded map in the sub-database.

20 Claims, 6 Drawing Sheets

(51) Int. Cl.
 G06T 15/50 (2011.01)
 G06F 16/29 (2019.01)
 G06T 7/73 (2017.01)
(52) U.S. Cl.
 CPC .... *G06T 19/20* (2013.01); *G06T 2207/30244* (2013.01); *G06T 2219/2004* (2013.01)

(56) References Cited

U.S. PATENT DOCUMENTS

2020/0080855 A1* 3/2020 Pandit ................ G01C 21/3848
2022/0349719 A1* 11/2022 Brewington ....... G01C 21/3644

OTHER PUBLICATIONS

ISR for PCT/CN2020/133916.
Written opinions of ISA for PCT/CN2020/133916.

* cited by examiner

MAP DATABASE CREATION METHOD, MOBILE MACHINE USING THE SAME, AND COMPUTER READABLE STORAGE MEDIUM

CROSS REFERENCE TO RELATED APPLICATIONS

The present application is a continuation-application of International Application PCT/CN2020/133916, with an international filing date of Dec. 4, 2020, the contents of all of which are hereby incorporated by reference.

BACKGROUND

1. Technical Field

The present disclosure relates to computer technology, and particularly to a map database creation method, a mobile machine using the same, and a computer readable storage medium.

2. Description of Related Art

At present, visual SLAM (simultaneous localization and mapping) based indoor positioning have become a popular research topic because of its rich in visual information and low cost. However, there are only a few related applications, which is mainly due to the limitations in the changes of the lighting in the indoor environment and will significantly affect the accuracy and robustness of visual SLAM based positioning.

The positioning realized through the current visual SLAM based positioning relies on the map created by itself. However, a map only contains the lighting at the time of its mapping, and does not contain the lighting of other times and other weathers. Therefore, when used in other times or other weathers, the effect of positioning will be deteriorated. In addition, the lighting in indoor scenes change frequently. For example, even the lighting in the morning, afternoon and evening of the same day will be very different, while the changes in, for example, rainy or cloudy weather have to be considered. Therefore, the current positioning method that only relies on a map cannot achieve accurate positioning.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
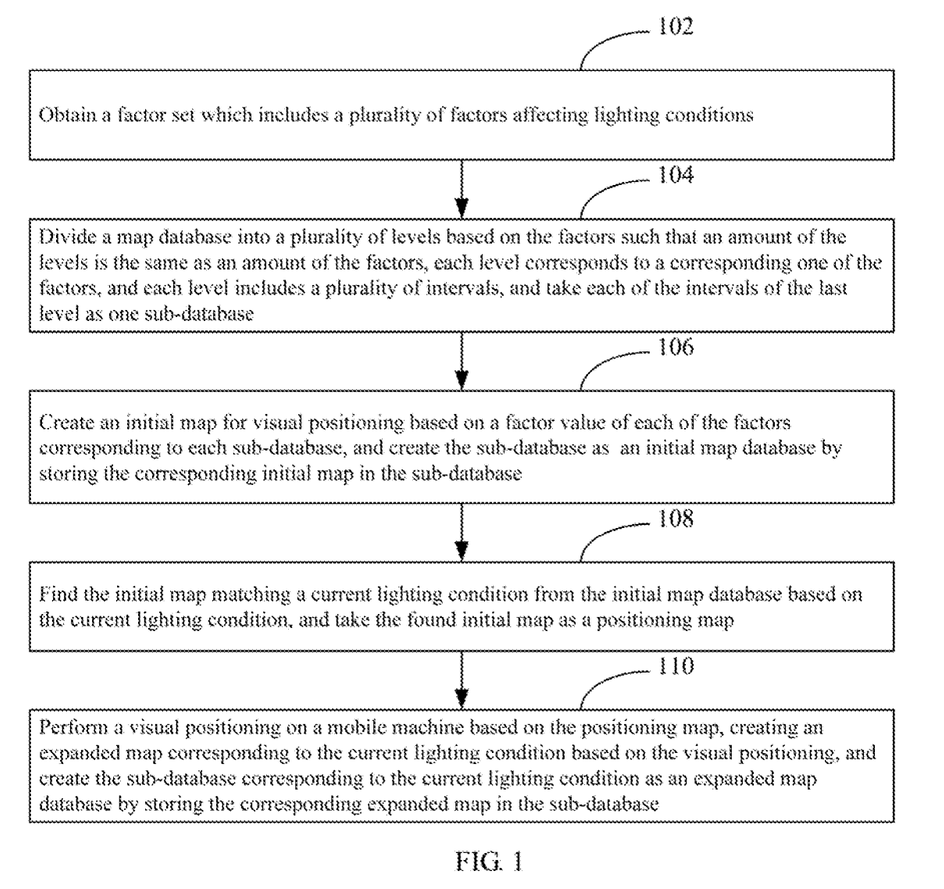
FIG. 1 is a flow chart of a map database creation method according to an embodiment of the present disclosure.

FIG. 1 is a flow chart of a map database creation method according to an embodiment of the present disclosure. A map database creation method is provided. In this embodiment, the map database creation method is a computer-implemented method executable for a processor, which may be applied to a map database creation apparatus shown in FIG. 2 or a mobile machine (e.g., a robot or a vehicle) shown in FIG. 3. As shown in FIG. 1, in one embodiment, the method may include the following steps.

102: obtaining a factor set which includes a plurality of factors affecting lighting conditions.

In which, the factors in the factor set that affect the lighting of an indoor environment mainly include time, weather, and lamp lighting. There has different lighting at different times. For example, the lighting in the morning, noon, and evening of a day is different. In different weathers, there has different lighting. For example, the lighting in sunny, cloudy, overcast and rainy days are different. In different lamp lighting, there also has different lighting. For example, the lighting in different on/off conditions and different number of lamps is different.

104: dividing a map database into a plurality of levels based on the factors such that an amount of the levels is the same as an amount of the factors, each level corresponds to a corresponding one of the factors, and each level includes a plurality of intervals, and taking each of the intervals of the last level as one sub-database.

In which, the map database is divided into a plurality of levels according to the number of the factors, where the number of the levels is the same as that of the factors. For example, if there are 3 factors, it will be divided into 3 levels, and the lower level is a subset of the higher level. For example, if there are three factors, namely the first factor, the second factor, and the third factor, in a division, the map database is divided into a plurality of first intervals according to the first factor first, then each first interval is divided into a plurality of second intervals according to the second factor, and finally each second interval is divided into a plurality of third intervals according to the third factor to take each obtained third interval as one sub-database.

106: creating an initial map for visual positioning based on a factor value of each of the factors corresponding to each sub-database, and creating the sub-database as an initial map database by storing the corresponding initial map in the sub-database.

In which, after the map database is divided into sub-libraries, the initial map corresponding to each sub-database needs to be created to store in the sub-database, so as to realize the creation of the initial map database. The factor value refers to the corresponding value of each factor. For example, if there are four kinds of weathers, there will have four factor values. Each sub-database corresponds to one of the factor values of each factor. For example, if there are two factors of time and weather, the weather is divided into 4 kinds namely sunny, cloudy, overcast, and rainy, and the time is divided into 3 periods such as between 6 o'clock and 10 o'clock, between 10 o'clock and 18 o'clock, and between 18 o'clock and 6 o'clock, the map database will be divided into four intervals according to the weather first, then each interval is divided into three sub-intervals according to the time, thereby obtaining 12 sub-libraries. Each sub-database corresponds to the factor value of the weather and that of the time. For example, if sub-database 1 corresponds to the weather of sunny and the time between 6 o'clock and 10 o'clock, the map stored in the sub-database 1 is the initial map corresponds to sunny day which is created at the time between 6 o'clock and 10 o'clock.

108: finding the initial map matching a current lighting condition from the initial map database based on the current lighting condition, and taking the found initial map as a positioning map.

In which, after the initial map database is created, a visual positioning is performed based on the initial map database. First, the current lighting condition is obtained. The current lighting condition may include current time, current weather, and the like. The initial map matching the current lighting condition is found from the initial map database according to the current lighting condition to take as the positioning map. In this way, different positioning maps can be selected for different lighting, so that accurate positioning can be realized in any lighting.

110: performing a visual positioning on the mobile machine based on the positioning map, creating an expanded map corresponding to the current lighting condition based on the visual positioning, and creating the sub-database corresponding to the current lighting condition as an expanded map database by storing the corresponding expanded map in the sub-database.

In which, since the number of maps stored in the created initial map database is small, in order to enrich the map database, the map database needs to be continuously expanded in the subsequent actual applications. An expanded map corresponding to the current lighting condition will be created based on the visual positioning while performing the visual positioning based on the positioning map, and then the expanded map will also be stored in the map database, so that a more accurate map can be matched from the map database later.

In the above-mentioned map database creation method, by first dividing the map database into a plurality of levels based on the factors affecting lighting conditions such that each level includes a plurality of intervals so as to take each of the intervals of the last level as one sub-database, and then starting to create the initial map according to each factor value corresponding to each sub-database, and eventually the created initial map is stored in the sub-database to obtain the initial map database. In order to further expand the initial map database, the matched initial map is selected from the initial map database according to the current lighting condition to take as the positioning map, then the visual positioning is performed based on the positioning map, and then the expanded map corresponding to the current lighting condition is created according to the visual positioning, and eventually the expanded map is stored in the sub-database corresponding to the current lighting condition to obtain the expanded map database. The creation of the map database is conducive to find the matched map from the map database according to the current lighting condition, so as to realize the accurate visual positioning in any lighting, and the map database will be continuously expanded during use. By continuously enriching the map database, which is helpful to further improve the accuracy of the visual positioning.

In one embodiment, the factor set includes a first factor and a second factor; where the dividing the map database into the plurality of levels based on the factors such that the amount of the levels is the same as the amount of the factors, each level corresponds to a corresponding one of the factors, and each level includes the plurality of intervals, and taking each of the intervals of the last level as the sub-database includes: dividing the map database into two levels according to the first factor and the second factor, dividing the map database into a plurality of first intervals according to the factor value of the first factor; dividing each of the first intervals into a plurality of second intervals according to the factor value of the second factor; and taking each of the second intervals as one sub-database.

Figure 2:
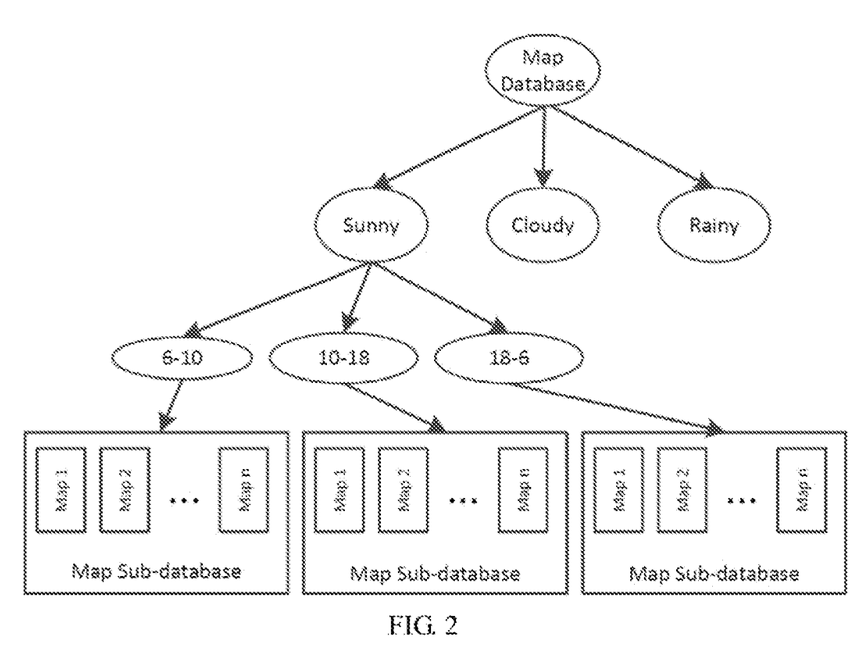
FIG. 2 is a schematic diagram of a map database created in the embodiment of FIG. 1.

In which, the factor set may include two factors, namely the first factor and the second factor. In this way, the map database can be divided into two levels. First, the map database is divided into a plurality of first intervals according to the factor values of the first factor. The first interval is in the first level. Then, according to the second factor, the first interval is divided into a plurality of second intervals, and the second interval is taken as the sub-database. FIG. 2 is a schematic diagram of a map database created in the embodiment of FIG. 1. Referring FIG. 2, the structure of a created map database is shown. In this embodiment, the first factor is weather, and the second factor is time. The weather is divided into a plurality of weather conditions, and the time is divided into a plurality time periods.

In one embodiment, the factor set may include three factors, namely weather, time and lamp lighting. In which, not only weather and time, but also lamp lighting are considered. The on/off conditions of the lamp lighting affect the indoor light, and the intensity of the lamp lighting also affects the indoor light. When the factor set also includes lamp lighting, it is necessary to continue to subdivide according to the lamp lighting based on the second interval, that is, each second interval will be subdivided into a plurality of third intervals, and finally the third interval will be taken as the sub-database.

In one embodiment, the creating the initial map for visual positioning based on a factor value of each of the factors corresponding to each sub-database, and creating the sub-database as the initial map database by storing the corresponding initial map in the sub-database may include: creating the initial map based on the factor value of each of the factors corresponding to each sub-database using ORB-SLAM2, where the initial map corresponding to each sub-database is created from a same spatial pose.

In which, ORB-SLAM2 which is an open source visual positioning and mapping algorithm may be used to create the initial map. When the initial map is created, the map is created from the same spatial pose every time to ensure that all the maps share a coordinate system, thereby avoiding the problems of coordinate alignment and coordinate conversion.

In one embodiment, the performing the visual positioning on the mobile machine based on the positioning map, creating the expanded map corresponding to the current lighting condition based on the visual positioning may include: obtaining an absolute pose of the camera based on the positioning map using a tracking module of ORB-SLAM2, obtaining a relative pose of the camera by performing a relative positioning on an image captured by the camera using a visual odometer module of ORB-SLAM2, and obtaining the optimized absolute pose of the camera by performing an optimizing fusion on the absolute pose and the relative pose using a nonlinear optimization module of ORB-SLAM2; and creating a new expanded map based on the optimized absolute pose of the camera using a mapping module of ORB-SLAM2, where the new expanded map has a same coordinate system with the positioning map.

Figure 3:
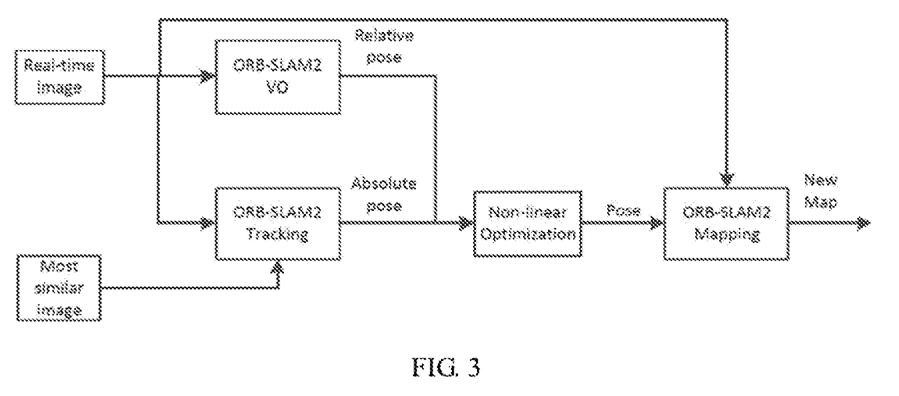
FIG. 3 is a schematic diagram of creating a new map in the embodiment of FIG. 1.

FIG. 3 is a schematic diagram of creating a new map in the embodiment of FIG. 1. As shown in FIG. 3, a new map is created. In which, the tracking module in ORB-SLAM2 is used to locate the absolute pose of the camera on the map. The absolute pose refers to the pose relative to the origin. The visual odometer (VO) module in ORB-SLAM2 is used to perform the relative positioning on the images captured by the camera to obtain the relative pose of the camera. The relative pose refers to the pose relative to that of the previous frame of image. The non-linear optimization module of ORB-SLAM2 is used to optimize and fuse the absolute pose and relative pose to obtain the optimized absolute pose of the camera. Then, based on the optimized absolute pose of the camera, the mapping module of ORB-SLAM2 is used to mapping so as to obtain a new map. The new map is added to the map database to obtain the expanded map database. It should be noted that, since the pose of the newly created map is obtained by fusing the absolute pose in the positioning map, the new map and the positioning map have the same coordinate system, and no additional alignment and conversion are required.

In one embodiment, the obtaining the optimized absolute pose of the camera by performing the optimizing fusion on the absolute pose and the relative pose using the optimization module of ORB-SLAM2 may include: obtaining a relative pose constraint corresponding to the relative pose, and calculating an initial absolute pose based on the relative pose and the relative pose constraint; and obtaining an absolute pose constraint, and obtaining a target absolute pose by optimizing the initial absolute pose based on the absolute pose constraint.

Figure 4:
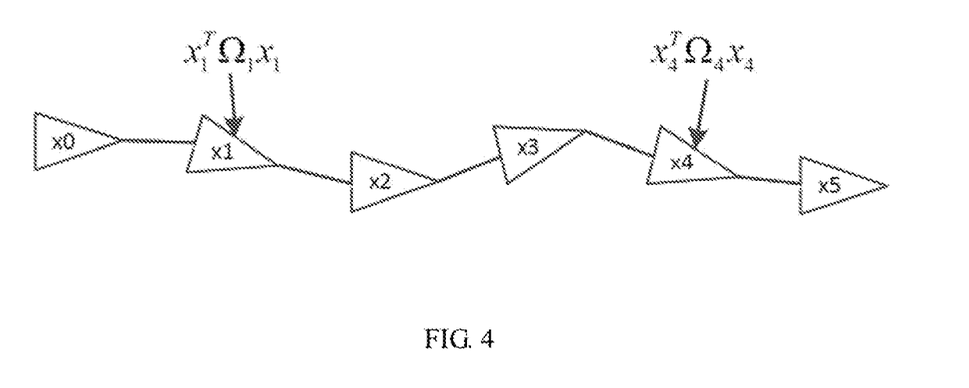
FIG. 4 is a schematic diagram of optimizing using a nonlinear optimization module in the embodiment of FIG. 1.

In which, in the nonlinear optimization module, the relative pose is optimized using the relative pose constraint, then the initial absolute pose is calculated based on the optimized relative pose. Then, the absolute pose constraint are obtained, and the absolute pose is optimized based on the absolute pose constraint to obtain the target absolute pose. FIG. 4 is a schematic diagram of optimizing using a nonlinear optimization module in the embodiment of FIG. 1. As shown in FIG. 4, the triangles represent the optimization nodes, that is, the absolute pose $x_i=[p_i,q_i]^T$ of the camera, where $p_i$ represents the coordinates and $q_i$ represents the direction. In the figure, the straight line without arrow represents the relative pose constraint from the VO module, and the straight line with arrow represents the absolute pose constraint from the tracking module, where $\Omega_i$ is the information matrix of the absolute pose.

In one embodiment, after the map database is created, the map database creation method may further include: obtaining the current lighting condition; finding a candidate map set matching the current lighting condition in the map database according to the current lighting condition, where the map database stores the maps under different lighting; collecting the image on the current lighting condition to match with the maps in the candidate map set so as to determine the map matching the image and take the matched map as the target map on the current lighting condition: creating the map database based on the target map.

In which, the images are collected on the current lighting condition through the camera. The collected images are matched with the maps in the candidate map set, and the map in the candidate map set that is most similar to the collected images is taken as the matched target map. The matching method of the images may be realized by calculating the similarity between the images, for example, using a DBoW2 based method. After the target map is determined, SLAM positioning technology is used to create the map database based on the target map. The map database creation method solves the problem that the changes of the lighting in the indoor environments affect the accuracy and robustness of visual SLAM positioning, so that the visual SLAM positioning can be used in the indoor environments for a long time without positioning failure due to lighting, weather, and the like, and is applicable to all kinds of indoor robots that need real-time positioning.

The above-mentioned map database creation method finds the candidate map set matching the current lighting condition from the map database according to the current lighting condition, then selects the target map matching the captured image from the candidate map set, and then creates the map database based on the target map. This method can create the map database by selecting the matched target map according to the current lighting condition, so that the map database can be created accurately even when the lighting changes.

In one embodiment, the current lighting condition may include: a current time and a current weather. The finding the candidate map set matching the current lighting condition in the map database according to the current lighting condition may include: selecting a first map set with a time difference from the current time within a preset range from the map database; selecting a second map set matching the current weather from the first candidate map set according to the current weather to take as the candidate map set.

In which, the current time is compared with the time of all the maps in the map database to take all the maps that meet the time difference dt (e.g., half an hour) as the first map set. The current weather is obtained, and all the maps with the weather similar to the current weather is selected from the first map set to form the second map set, that is, the candidate map set.

In one embodiment, the collecting the image on the current lighting condition to match with the maps in the candidate map set so as to determine the map matching the image and take the matched map as the target map on the current lighting condition may include: calculating the similarity between each candidate map in the candidate map set and the image; and finding the target map matching the image from the candidate map set according to the similarity.

In which, the matching between the captured image and the map is realized by calculating the similarity. There are some methods for calculating the similarity between each candidate map in the candidate map set and the captured image to take the candidate map with the largest similarity as the target map, for example, DBow2 based algorithm, SIFT based algorithm, ORB based algorithm, and the like, which may calculate using the existing similarity calculation method, and will not be repeated herein.

In one embodiment, the collecting the image on the current lighting condition to match with the maps in the candidate map set so as to determine the map matching the image and take the matched map as the target map on the current lighting condition may include: obtaining an image set by moving the camera to collect images for a period of time; obtaining the matching degree of each image and the candidate map by matching each image in the image set with the candidate map in the candidate map set; calculating the matching degree between the image set and the candidate map according to the matching degree between each image in the image set and the candidate map; and determining the target map matching the image set according to the matching degree between the image set and each candidate map.

In which, the image is collected on the current lighting condition. In order to be able to match a more accurate map, the images in a period of time may be collected to obtain a plurality of images to form an image set. It needs to match each image in the image set with the candidate map in the candidate map set, so that the matching degree between each image and the candidate map can be obtained. After obtaining the matching degree between each image and the candidate map, the matching degree between the image set and the candidate map may be calculated. In one embodiment, the average matching degree between the images in the image set and the candidate map may be calculated, and the average matching degree may be taken as the matching degree between the image set and the candidate map. Sorting may be performed according to the matching degree between the image set and each candidate map so as to take the candidate map with the largest matching degree as the target map. By accurately selecting the target map that most matches the current lighting condition, the accuracy and stability of the subsequent map database creation based on the target map can be improved.

In one embodiment, the calculating the matching degree between the image set and the candidate map according to the matching degree between each image in the image set and the candidate map may include: obtaining the matching degree between the image set and the candidate map by accumulating the matching degree between each image in the image set and the candidate map.

In which, the matching degree between the images in the image set and the candidate map are accumulated, and the accumulated value is taken as the matching degree between the image set and the candidate map. In one embodiment, which may be expressed through an equation of $$s_j = \sum_{i=1}^{n} s_{ij},$$

where i represents the i-th image in the image set, j represents the j-th candidate map, $s_j$ represents the matching degree between the image set and the j-th candidate map, and $s_{ij}$ represents the matching degree between the i-th image of the image set and the j-th candidate map. In one embodiment, the matching degree may be calculated using the DBoW2 algorithm, and the calculated matching degree may be represented by the BOW score. The higher the BOW score, the higher the matching degree.

In one embodiment, the calculating the matching degree between each image in the image set and the candidate map may include: parallelly calculating the matching degree between the candidate map and each image in the image set using a plurality of threads. In which, considering the calculation amount, when calculating the matching degree between the image set and the candidate map, a multi-threaded mode may be adopted.

In one embodiment, the map database creation method may further include; monitoring the lighting in real-time; and returning to the finding the candidate map set matching the current lighting condition in the map database according to the current lighting condition in response to the current lighting condition being detected as having changed.

In which, as the execution time increases, the lighting will slowly change. For example, it may be executed from the morning to the afternoon, and it starts to rain after a period of execution. These will change the lighting, so that the previously selected map is no longer applicable, and another map needs to be selected. That is, after having monitored the change of the current lighting condition, the candidate map set matching the current lighting condition will be found in the map database again according to the current lighting condition, thereby matching the target map.

In one embodiment, after the target map is determined, the open source positioning algorithm ORB-SLAM2 may be used. First, the ORB features and descriptors for each new frame of image that is collected by the camera are extracted, and then choose whether to track the previous key frame or use a speed model to track according to whether the speed of the camera is provided. If the speed of the camera is provided, the speed model is used for tracking; otherwise, the previous key frame is selected for tracking. Finally, the number of the tracked feature points is counted. If the number is too small, a relocation module will be started; otherwise, the next frame of image will be continued to process until the visual positioning is completed.

Figure 5:
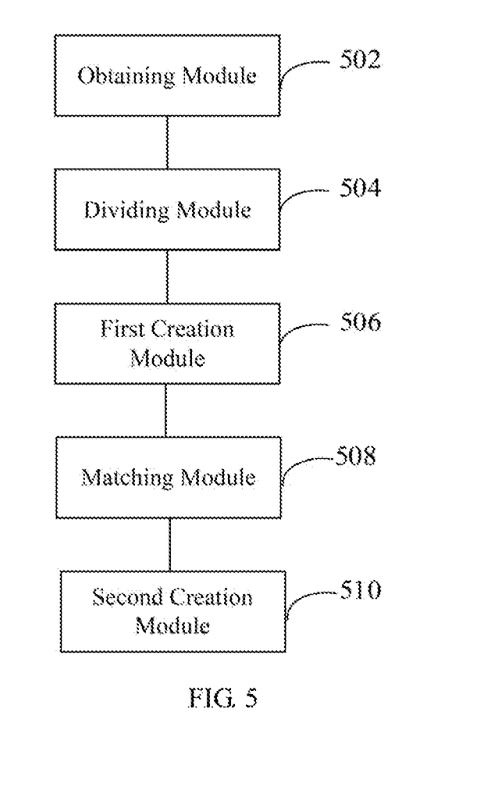
FIG. 5 is a schematic block diagram of a map database creation apparatus according to an embodiment of the present disclosure.

FIG. 5 is a schematic block diagram of a map database creation apparatus according to an embodiment of the present disclosure. A map database creation apparatus is provided. In this embodiment, the map database creation apparatus may be applied to a mobile machine (e.g., a robot or a vehicle) shown in FIG. 6. As shown in FIG. 5, in one embodiment, the apparatus may include:

an obtaining module 502 configured to obtain a factor set includes a plurality of factors affecting lighting conditions;

a dividing module 504 configured to divide a map database into a plurality of levels based on the factors such that an amount of the levels is the same as an amount of the factors, each level corresponds to a corresponding one of the factors, and each level includes a plurality of intervals, and taking each of the intervals of the last level as one sub-database;

a first creation module 506 configured to create an initial map for visual positioning based on a factor value of each of the factors corresponding to each sub-database, and creating the sub-database as an initial map database by storing the corresponding initial map in the sub-database;

a matching module 508 configured to find the initial map matching a current lighting condition from the initial map database based on the current lighting condition, and taking the found initial map as a positioning map; and a second creation module 510 configured to perform a visual positioning on the mobile machine based on the positioning map, creating an expanded map corresponding to the current lighting condition based on the visual positioning, and creating the sub-database corresponding to the current lighting condition as an expanded map database by storing the corresponding expanded map in the sub-database.

In one embodiment, the factor set includes a first factor and a second factor. The dividing module 504 is configured to divide the map database into two levels according to the first factor and the second factor; dividing the map database into a plurality of first intervals according to the factor value of the first factor; dividing each of the first intervals into a plurality of second intervals according to the factor value of the second factor; and taking each of the second intervals as one sub-database.

In one embodiment, the first factor is weather and the second factor is time.

In one embodiment, the factor set includes a weather condition factor, a time factor, and a lighting factor.

In one embodiment, the first creation module 506 is configured to create the initial map based on the factor value of each of the factors corresponding to each sub-database using ORB-SLAM2, where the initial map corresponding to each sub-database is created from a same spatial pose.

In one embodiment, the second creation module 510 is configured to obtain an absolute pose of the camera based on the positioning map using a tracking module of ORB-SLAM2, obtain a relative pose of the camera by performing a relative positioning on an image captured by the camera using a visual odometer module of ORB-SLAM2, and obtain the optimized absolute pose of the camera by performing an optimizing fusion on the absolute pose and the relative pose using an optimization module of ORB-SLAM2; and create a new expanded map based on the optimized absolute pose of the camera using a mapping module of ORB-SLAM2, where the new expanded map has a same coordinate system with the positioning map.

In one embodiment, the second creation module 510 is configured to obtain a relative pose constraint corresponding to the relative pose, and calculating an initial absolute pose based on the relative pose and the relative pose constraint; and obtain an absolute pose constraint, and obtaining a target absolute pose by optimizing the initial absolute pose based on the absolute pose constraint.

Figure 6:
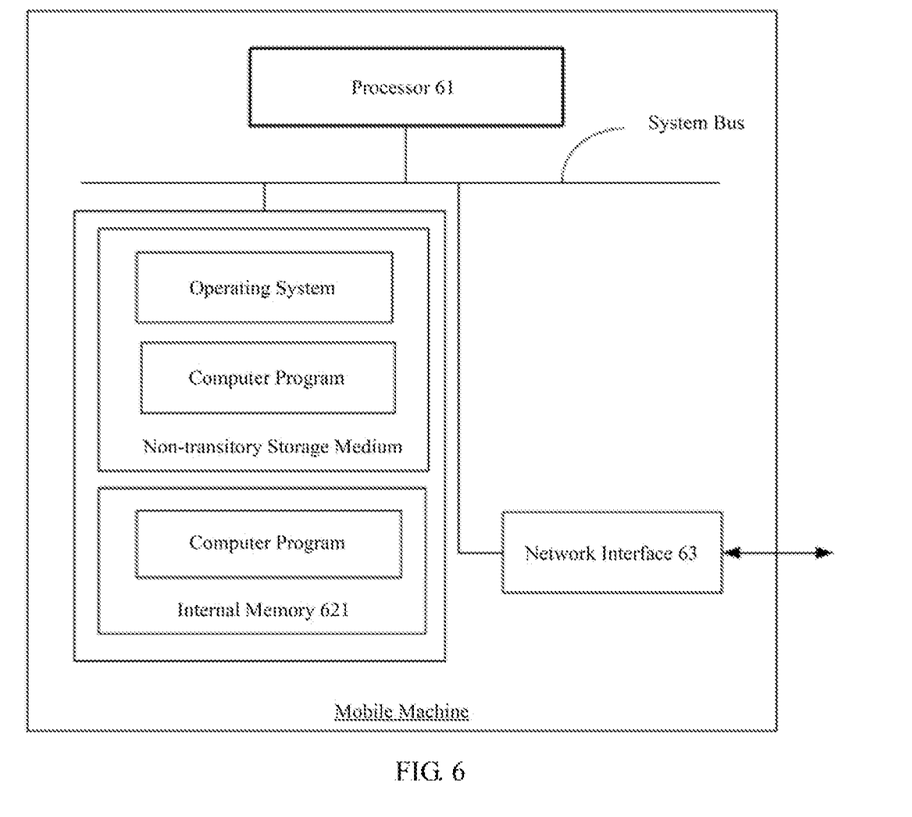
FIG. 6 is a schematic block diagram of a mobile machine according to an embodiment of the present disclosure.

FIG. 6 is a schematic block diagram of a mobile machine according to an embodiment of the present disclosure. A mobile machine (e.g., a robot or a vehicle) is provided. As shown in FIG. 6, the robot includes a processor 61, a storage, and a network interface 63 and a camera which are connected through a system bus. In which, the storage includes a non-volatile storage medium and an internal memory 621. The non-volatile storage medium of the robot stores an operating system, and may also store a computer program which enables the processor 61 to implement the map database creation method for robot sensors when executed by the processor 61. The internal memory 621 may also store a computer program which enables the processor 61 to perform the map database creation method for robot sensors when executed by the processor 61. It can be understood by those skilled in the art that, the structure shown in FIG. 6 is only a block diagram of a part of the structure related to the scheme of the present disclosure, and does not constitute a limitation of the robot to which the scheme of the present disclosure is applied. The specific robot may include more or fewer components than shown in the figures, or some components can be combined, or can have different component arrangements.

In one embodiment, the provided mobile machine includes the camera; the processor 61; the storage coupled to the processor; and computer program(s) stored in the memory and executable on the processor, where, the computer program(s) include: instructions for obtaining a factor set includes a plurality of factors affecting lighting conditions; instructions for dividing a map database into a plurality of levels based on the factors such that an amount of the levels is the same as an amount of the factors, each level corresponds to a corresponding one of the factors, and each level includes a plurality of intervals, and taking each of the intervals of the last level as one sub-database; instructions for creating an initial map for visual positioning based on a factor value of each of the factors corresponding to each sub-database, and creating the sub-database as an initial map database by storing the corresponding initial map in the sub-database; instructions for finding the initial map matching a current lighting condition from the initial map database based on the current lighting condition, and taking the found initial map as a positioning map; and instructions for performing a visual positioning on the mobile machine based on the positioning map, creating an expanded map corresponding to the current lighting condition based on the visual positioning, and creating the sub-database corresponding to the current lighting condition as an expanded map database by storing the corresponding expanded map in the sub-database.

In one embodiment, the factor set includes a first factor and a second factor. The instructions for dividing the map database into the plurality of levels based on the factors such that the amount of the levels is the same as the amount of the factors, each level corresponds to a corresponding one of the factors, and each level includes the plurality of intervals, and taking each of the intervals of the last level as the sub-database include: instructions for dividing the map database into two levels according to the first factor and the second factor; instructions for dividing the map database into a plurality of first intervals according to the factor value of the first factor; instructions for dividing each of the first intervals into a plurality of second intervals according to the factor value of the second factor; and instructions for taking each of the second intervals as one sub-database.

In one embodiment, the first factor is weather and the second factor is time.

In one embodiment, the factor set includes a weather condition factor, a time factor, and a lighting factor.

In one embodiment, the instructions for creating the initial map for visual positioning based on a factor value of each of the factors corresponding to each sub-database, and creating the sub-database as the initial map database by storing the corresponding initial map in the sub-database include: instructions for creating the initial map based on the factor value of each of the factors corresponding to each sub-database using ORB-SLAM2, where the initial map corresponding to each sub-database is created from a same spatial pose.

In one embodiment, where the instructions for performing the visual positioning on the mobile machine based on the positioning map, creating the expanded map corresponding to the current lighting condition based on the visual positioning include: instructions for obtaining an absolute pose of the camera based on the positioning map using a tracking module of ORB-SLAM2, obtaining a relative pose of the camera by performing a relative positioning on an image captured by the camera using a visual odometer module of ORB-SLAM2, and obtaining the optimized absolute pose of the camera by performing an optimizing fusion on the absolute pose and the relative pose using an optimization module of ORB-SLAM2; and instructions for creating a new expanded map based on the optimized absolute pose of the camera using a mapping module of ORB-SLAM2, where the new expanded map has a same coordinate system with the positioning map.

In one embodiment, the instructions for obtaining the optimized absolute pose of the camera by performing the optimizing fusion on the absolute pose and the relative pose using the optimization module of ORB-SLAM2 include: instructions for obtaining a relative pose constraint corresponding to the relative pose, and calculating an initial absolute pose based on the relative pose and the relative pose constraint; and instructions for obtaining an absolute pose constraint, and obtaining a target absolute pose by optimizing the initial absolute pose based on the absolute pose constraint.

In one embodiment, a non-transitory computer readable storage medium stored with computer program(s) is provided. When the computer program(s) are executed by processor(s), the processor(s) causes the processor(s) to execute the steps of the above-mentioned map database creation method.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

The technical features of the above-mentioned embodiments can be arbitrarily combined. For the sake of brevity of description, the descriptions do not include all possible combinations of the technical features in the above-mentioned embodiments. However, the combination of these technical features will be considered to be within the scope described in this specification as long as there is no contradiction.

The above-mentioned embodiments are merely illustrative of several embodiments of the present disclosure. Although the description is specific and detailed, it should not to be comprehended as limiting the scope of the present disclosure. It should be noted that, for those skilled in the art, a number of variations and improvements can still be made without departing from the spirit and scope of the present disclosure. Therefore, the scope of the present disclosure should be determined by the appended claims.

What is claimed is:

1. A computer-implemented map database creation method for a mobile machine, comprising:
   obtaining a factor set including a plurality of factors affecting lighting conditions;
   dividing a map database into a plurality of levels based on the factors such that an amount of the levels is the same as an amount of the factors, each level corresponds to a corresponding one of the factors, and each level includes a plurality of intervals, and taking each of the intervals of a last level as one sub-database;
   creating an initial map for visual positioning based on a factor value of each of the factors corresponding to each sub-database, and creating the sub-database as an initial map database by storing the corresponding initial map in the sub-database;
   finding the initial map matching a current lighting condition from the initial map database based on the current lighting condition, and taking the found initial map as a positioning map; and
   performing a visual positioning on the mobile machine based on the positioning map, creating an expanded map corresponding to the current lighting condition based on the visual positioning, and creating the sub-database corresponding to the current lighting condition as an expanded map database by storing the corresponding expanded map in the sub-database.

2. The method of claim 1, wherein the factor set includes a first factor and a second factor; wherein the dividing the map database into the plurality of levels based on the factors such that the amount of the levels is the same as the amount of the factors, each level corresponds to a corresponding one of the factors, and each level includes the plurality of intervals, and taking each of the intervals of the last level as the sub-database comprises:
   dividing the map database into two levels according to the first factor and the second factor;
   dividing due map database into a plurality of first intervals according to the factor value of the first factor;
   dividing each of the first intervals into a plurality of second intervals according to the factor value of the second factor; and
   taking each of the second intervals as one sub-database.

3. The method of claim 2, wherein the first factor is weather and the second factor is time.

4. The method of claim 1, wherein the factor set includes a weather condition factor, a time factor, and a lighting factor.

5. The method of claim 1, wherein the creating the initial map for visual positioning based on a factor value of each of the factors corresponding to each sub-database, and creating the sub-database as the initial map database by storing the corresponding initial map in the sub-database comprises:
   creating the initial map based on the factor value of each of the factors corresponding to each sub-database using ORB-SLAM2, wherein the initial map corresponding to each sub-database is created from a. same spatial pose.

6. The method of claim 1 wherein the mobile machine has a camera, and the performing the visual positioning on the mobile machine based on the positioning map, creating the expanded map corresponding to the current lighting condition based on the visual positioning comprises:
   obtaining an absolute pose of the camera based on the positioning map using a tracking module of ORB-SLAM2, obtaining a relative pose of the camera by performing a relative positioning on an image captured by the camera using a visual odometer module of ORB-SLAM2, and obtaining the optimized absolute pose of the camera by performing an optimizing fusion on the absolute pose and the relative pose using an optimization module of ORB-SLAM2; and
   creating a new expanded map based on the optimized absolute pose of the camera using a mapping module of ORB-SLAM2, wherein the new expanded map has a same coordinate system with the positioning map.

7. The method of claim 6, wherein the obtaining the optimized absolute pose of the camera by performing the optimizing fusion on the absolute pose and the relative pose using the optimization module of ORB-SLAM2 comprises:
   obtaining a relative pose constraint corresponding to the relative pose, and calculating an initial absolute pose based on the relative pose and the relative pose constraint; and
   obtaining an absolute pose constraint, and obtaining a target absolute pose by optimizing the initial absolute pose based on the absolute pose constraint.

8. A mobile machine, comprising;
   a processor;

a memory coupled to the processor; and
one or more computer programs stored in the memory and executable on the processor;
wherein, the one or more computer programs comprise:
instructions for obtaining a factor set including a plurality of factors affecting lighting conditions;
instructions for dividing a map database into a plurality of levels based on the factors such that an amount of the levels is the same as an amount of the factors, each level corresponds to a corresponding one of the factors, and each level includes a plurality of intervals, and taking each of the intervals of a last level as one sub-database;
instructions for creating an initial map for visual positioning based on a factor value of each of the factors corresponding to each sub-database, and creating the sub-database as an initial map database by storing the corresponding initial map in the sub-database;
instructions for finding the initial map matching a current lighting condition from the initial map database based on the current lighting condition, and taking the found initial map as a position map; and
instructions for performing a visual positioning on the mobile machine based on the positioning map, creating an expanded map corresponding to the current lighting condition based on the visual positioning, and creating the sub-database corresponding to the current lighting condition as an expanded map database by storing the corresponding expanded map in the sub-database.

9. The mobile machine of claim 8, wherein the factor set includes a first factor and second factor; wherein the instructions for dividing the map database into the plurality of levels based on the factors such that the amount of the levels is the same as the amount of the factors, each level corresponds to a corresponding one of the factors, and each level includes the plurality of internals, and taking each of the intervals of the last level as lie sub-database comprise:
instructions for dividing the map database into two levels according to the first factor and the second factor;
instructions for dividing the map database into a plurality of first intervals according to the factor value of the first factor;
instructions for dividing each of the first intervals into a plurality of second intervals according to the factor value of the second factor; and
instructions for taking each of the second intervals as one sub-database.

10. The mobile machine of claim 9, wherein the first factor is weather and the second factor is time.

11. The mobile machine of claim 8. wherein the factor set includes a weather condition factor, a time factor, and a lighting factor.

12. The mobile machine of claim 8, wherein the instructions for creating the initial map for visual positioning based on a factor value of each of the factors corresponding to each sub-database, arid creating the sub-database as the initial map database by storing the corresponding initial map in the sub-database comprise:
instructions for creating the initial map based on the factor value of each of the factors corresponding to each sub-database using ORB-SLAM2, wherein the initial map corresponding to each sub-database is created from a same spatial pose.

13. The mobile machine of claim 8, wherein the mobile machine further comprises a camera, and the instructions for performing the visual positioning on the mobile machine based on the positioning map, creating the expanded map corresponding to the current lighting condition based on the visual positioning comprise:
instructions for obtaining an absolute pose of the camera based on the positioning map using a tracking module of ORB-SLAM2, obtaining a relative pose of the camera by performing a relative positioning on an image captured by the camera using a visual odometer module of ORB-SLAM2, and obtaining the optimized absolute pose of the camera by performing an optimizing fusion on the absolute pose and the relative pose using an optimization module of ORB-SLAM2; and
instructions for creating a new expanded map based on the optimized absolute pose of the camera using a mapping module of ORB-SLAM2, wherein the new expanded map has a same coordinate system with the positioning map.

14. The mobile machine of claim 13, wherein the instructions for obtaining the optimized absolute pose of the camera by performing the optimizing fusion on the absolute pose and the relative pose using the optimization module of ORB-SLAM2 comprise:
instructions for obtaining a relative pose constraint corresponding to the relative pose, and calculating an initial absolute pose based on the relative pose and the relative pose constraint; and
instructions for obtaining an absolute pose constraint, and obtaining a target absolute pose by optimizing the initial absolute pose based on the absolute pose constraint.

15. A non-transitory computer readable storage medium for storing one or more computer programs, wherein the one or more computer programs comprise:
instructions for obtaining a factor set including a plurality of factors affecting lighting conditions;
instructions for dividing a map database into a plurality of levels based on the factors such that an amount of the levels is the same as an amount of the factors, each level corresponds to a corresponding one of the factors, and each level includes a plurality of intervals, and taking each of the intervals of a last level as one sub-database;
instructions for creating an initial map for visual positioning based on a factor value of each of the factors corresponding to each sub-database, and creating the sub-database as an initial map database by storing the corresponding initial map in the sub-database;
instructions for finding the initial map matching a current lighting condition from the initial map database based on the current lighting condition, and taking the found initial map as a positioning map; and
instructions for performing a visual positioning on a mobile machine based on the positioning map, creating an expanded map corresponding to the current lighting condition based on the visual positioning, and creating the sub-database corresponding to the current lighting condition as an expanded map database by storing, the corresponding expanded map in the sub-database.

16. The storage medium of claim 15, wherein the factor set includes a first factor and a second factor; wherein the instructions for dividing, the map database into the plurality of levels based on the factors such that the amount of the levels is the same as the amount of the factors, each level corresponds to a corresponding one of the factors, and each level includes the plurality of intervals, and taking each of the intervals of the last level as the sub-database comprise:

instructions for dividing the map database into two levels according to the first factor and the second factor;

instructions for dividing the map database into a plurality of first intervals according to the factor value of the first factor;

instructions for dividing each of the first intervals into a plurality of second intervals according to the factor value of the second factor; and instructions for taking each of the second intervals as one sub-database.

17. The storage medium of claim 16, wherein the first factor is weather and the second factor is time.

18. The storage medium of claim 15, wherein the factor set includes a weather condition factor, a time factor, and a lighting factor.

19. The storage medium of claim 15, wherein the instructions for creating the initial map for visual positioning based on a factor value of each of the factors corresponding to each sub-database, and creating the sub-database as the initial map database by storing the corresponding initial map in the sub-database comprise:

instructions for creating the initial map based on the factor value of each of the factors corresponding to each sub-database using ORB-SLAM2, Wherein the initial map corresponding to each sub-database is created from a same spatial pose.

20. The storage medium of claim 15, wherein the mobile machine has a camera, and the instructions for performing the visual positioning on the mobile machine based on the positioning map, creating the expanded map corresponding to the current lighting condition based on the visual positioning comprise:

instructions for obtaining an absolute pose of the camera based on the positioning map using a tracking module of ORB-SLAM2, obtaining a relative pose of the camera by performing a relative positioning on an image captured by the camera using a visual odometer module of ORB-SLAM2, and obtaining the optimized absolute pose of the camera by performing an optimizing fusion on the absolute pose and the relative pose using an optimization module of ORB-SLAM2; and instructions for creating a new expanded map based on the optimized absolute pose of the camera using a mapping module of ORB-SLAM2, wherein the new expanded map has a same coordinate system with the positioning map.

* * * * *